United States Patent
Aggarwal et al.

(10) Patent No.: US 8,068,171 B2
(45) Date of Patent: Nov. 29, 2011

(54) HIGH SPEED FOR DIGITAL VIDEO

(75) Inventors: Gaurav Aggarwal, Andover, MA (US); M K Subramanian, Bangalore (IN); Sandeep Bhatia, Bangalore (IN); Santosh Savekar, Bangalore (IN); K Shivapirakasan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/730,911

(22) Filed: Mar. 24, 2010

(65) Prior Publication Data

US 2010/0177823 A1 Jul. 15, 2010

Related U.S. Application Data

(62) Division of application No. 10/874,621, filed on Jun. 22, 2004, now abandoned.

(51) Int. Cl.
| | |
|---|---|
| *H04N 7/01* | (2006.01) |
| *H04N 7/08* | (2006.01) |
| *H04N 5/783* | (2006.01) |
| *H04N 5/92* | (2006.01) |

(52) U.S. Cl. ... 348/441; 386/206; 386/344; 375/240.26; 348/901

(58) Field of Classification Search .................. 348/901, 348/441, 459, 578, 739; 386/68, 77, 82, 386/109, 111, 206, 344, 345; 375/240.25, 375/240.29

See application file for complete search history.

(56) References Cited

U.S. PATENT DOCUMENTS

| 5,282,049 A * | 1/1994 | Hatakenaka et al. ......... 386/111 |
| 6,023,553 A * | 2/2000 | Boyce et al. .................. 386/109 |
| 7,231,516 B1 * | 6/2007 | Sparrell et al. ................ 713/156 |

* cited by examiner

*Primary Examiner* — Victor Kostak
(74) *Attorney, Agent, or Firm* — Thomas, Kayden, Horstemeyer & Risley, LLP (57) ABSTRACT

Disclosed are various embodiments for displaying pictures at high speed. In one embodiment, a system includes a buffer for storing parameters associated with a predetermined number of the pictures during a video display period. The system further includes a video decoder for decoding particular ones of the predetermined number of the pictures. The predetermined ones are either reference pictures or pictures that are to be displayed at high speed. The pictures that are displayed in high speed at each display interval have a constant time-lapse between the pictures that are displayed in high speed at the next display interval.

8 Claims, 7 Drawing Sheets

| Vsynch | 0 | 1 | 2 | 3 …2n | Slow Motion / 2n+1 | 2n+2 | … | 2n+y | 2n+y+1 | 2n+y+2 … | 2n+2y |
|---|---|---|---|---|---|---|---|---|---|---|---|
| Even # Lines | $T_0$ | | $T_1$ | $T_n$ | | $T_n$ | … | | $B_n$ | … | $B_n$ |
| Odd # Lines | | $B_0$ | $B_1$ | $T_n$ | | | $T_n$ | | $B_n$ | | |

| VDP | 0 | 1 | 2 | 3 | 4 | 5 | 6 | n | n+1 | n+2 | n+3 |
|---|---|---|---|---|---|---|---|---|---|---|---|
| DISPLAY ORDER (normal speed) | $I_0$ | $B_1$ | $B_2$ | $I/P_3$ | $B_4$ | $B_5$ | $I/P_6$ | ... | $I/P_n$ | $B_{n+1}$ | $B_{n+2}$ | $I/P_{n+3}$ |
| DECODE ORDER | $I/P_3$ | $B_1$ | $B_2$ | $I/P_6$ | $B_4$ | $B_5$ | $I/P_9$ | ... | $I/P_{n-3}$ | $B_{n+1}$ | $B_{n+2}$ | $I/P_{n+6}$ |

| VDP | Decoder | F1 | F2 | F3 | Display Engine |
|---|---|---|---|---|---|
| 0 | $I/P_3$ | $I_0$ | $I/P_3$ |  | $I_0$ |
| 1 | $B_1$ | $I_0$ | $I/P_3$ | $B_1$ | $B_1$ |
| 2 | $B_2$ | $I_0$ | $I/P_3$ | $B_2$ | $B_2$ |
| 3 | $I/P_6$ | $I/P_6$ | $I/P_3$ | $B_2$ | $I/P_3$ |
| 4 | $B_4$ | $I/P_6$ | $I/P_3$ | $B_4$ | $B_4$ |
| 5 | $B_5$ | $I/P_6$ | $I/P_3$ | $B_5$ | $B_5$ |
| 6 | $I/P_9$ | $I/P_6$ | $I/P_9$ | $B_5$ | $I/P_6$ |
| : | : | : | : | : | : |
| n | $I/P_{n-3}$ | $I/P_{n+3}$ | $I/P_n$ | X | $I/P_n$ |
| n+1 | ~~$B_{n+1}$~~, $B_{n+2}$ | $I/P_{n+3}$ | $I/P_n$ | $B_{n+2}$ | $B_{n+2}$ |
| n+2 | $I/P_{n-6}$, $B_{n+4}$ | $I/P_{n+3}$ | $I/P_{n-6}$, | $B_{n+4}$ | $B_{n+4}$ |
| n+3 | ~~$B_{n+5}$~~, $I/P_{n+9}$ | $I/P_{n+9}$ | $I/P_{n-6}$, | $B_{n+4}$ | $I/P_{n+6}$ |
| n+4 | $B_{n+7}$, $B_{n+8}$ | $I/P_{n+9}$ | $I/P_{n-6}$, | $B_{n+8}$ | $B_{n+8}$ |

FIGURE 6

HIGH SPEED FOR DIGITAL VIDEO

RELATED APPLICATIONS

This application is a divisional application of and claims priority to "Slow Motion and High Speed for Digital Video", U.S. application Ser. No. 10/874,621, filed Jun. 22, 2004 by Aggarwal, which is incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Television (TV) content distribution is quickly migrating from analog formats to compressed digital formats. Currently, distribution of digital video content for TV display is dominated by use of the MPEG-2 video compression standard (ISO/IEC 13818-2). MPEG-2 and its predecessor MPEG-1 define the standards to compress video content using a combination of various techniques. An MPEG-encoded stream may have three types of pictures, Intra-coded (I), Predicted (P) and Bi-directionally predicted (B). I-pictures are not compressed using any temporal predictions and can be decoded without the need of any other picture. The P-pictures perform temporal predictions from a picture that comes before it in the display order. Thus, decode of a P-pictures requires one picture (from the past) to be available with the decoder for performing temporal predictions. This prediction picture may be either an I-picture or another P-picture. The B-pictures are bi-directionally predicted and, hence, use two pictures for prediction, one from the past and another from the future (in display order).

During normal decode of MPEG streams, video decoders store the last two decompressed I/P pictures in memory. The last I/P picture is used for predicting an incoming P-picture and the last two I/P pictures are used for predicting an incoming B-picture.

However, additional functions allow the user to control the presentation of the video data. These functions include pause, freeze, slow motion, and high speed. The pause function stops the video during video playback. The video does not move forward and the last displayed picture is continuously redisplayed until the user releases the pause. When the user releases the pause, playback of the video resumes from the point where it was paused. The video freeze freezes a picture from a streaming broadcast (in contrast to video from a storage device). Since the video is streaming, when the user releases the freeze, play is resumed from the point where the freeze is released. The video to be displayed between the freeze and the freeze release is lost.

During the slow motion function, the video is displayed at a slower rate, controllable by the user. This can be implemented by repeating pictures. However, where the video comprises interlaced pictures, the display device scans alternating lines during each vertical synchronization pulse. The alternating lines during a first vertical synchronization pulse correspond to either a top field or a bottom field. The alternating lines during a second vertical synchronization pulse correspond to the other of the top field and bottom field. Displaying the top field and bottom fields in alternate order over several vertical synchronization pulses results in a jittery displayed picture.

During the high speed function, the video is displayed at a faster speed. However, because the display device scans the display pictures at the same speed, pictures are skipped to achieve the higher speed. Additionally, because I and P pictures are needed for decoding other pictures, the I and P pictures are decoded. A common scheme for implementing the high speed function involves skipping only B-pictures. However, in cases where B-pictures are back to back, the pictures are not dropped uniformly.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

Presented herein are systems and methods for slow motion and high speed for digital video.

In one embodiment, there is presented a method for displaying pictures. The method comprises displaying a top field from a particular picture, for a predetermined number of consecutive vertical synchronization pulses; and displaying a bottom field from the particular picture for the predetermined number of consecutive vertical synchronization pulses.

In another embodiment, there is presented a method for displaying pictures. The method comprises receiving an indication to display the pictures at high speed by a factor of a predetermined number; examining the predetermined number of the pictures during a video display period; and decoding particular ones of the predetermined pictures, wherein the predetermined ones are either reference pictures or pictures that are to be displayed at high speed.

In another embodiment, there is presented a system for displaying pictures. The system comprises a display engine for providing a top field from a particular picture for display for a predetermined number of consecutive vertical synchronization pulses and for providing a bottom field from the particular picture for display for the predetermined number of consecutive vertical synchronization pulses.

In another embodiment, there is presented a system for displaying pictures at high speed by a factor of a predetermined number. The system comprises a buffer and a video decoder. The buffer stores parameters associated with the predetermined number of the pictures during a video display period. The video decoder decodes particular ones of the predetermined pictures, wherein the predetermined ones are either reference pictures or pictures that are to be displayed at high speed.

A better understanding of the invention can be obtained when the following detailed description of various exemplary embodiments is considered in conjunction with the following drawings.

BRIEF DESCRIPTION OF SEVERAL VIEWS OF THE DRAWINGS

These and other advantageous and novel features as well as details of illustrated embodiments will be more fully understood from the following description and drawings.

DETAILED DESCRIPTION OF THE INVENTION

Figure 1A:
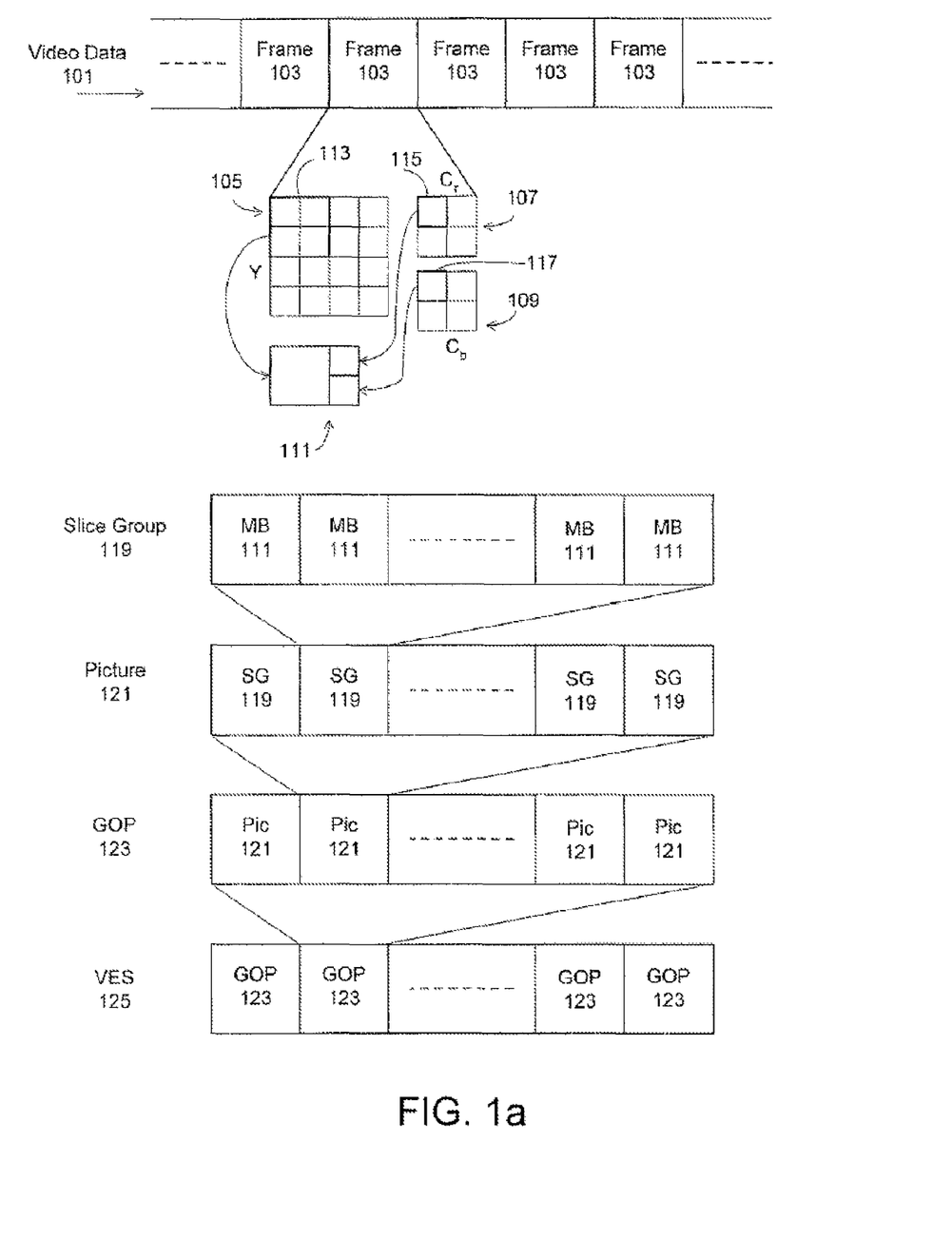
FIG. 1a illustrates a block diagram of an exemplary Moving Picture Experts Group (MPEG) encoding process, in accordance with an embodiment of the present invention.

FIG. 1a illustrates a block diagram of an exemplary Moving Picture Experts Group (MPEG) encoding process of video data 101, in accordance with an embodiment of the present invention. The video data 101 comprises a series of frames 103. Each frame 103 comprises two-dimensional grids of luminance Y, 105, chrominance red $C_r$, 107, and chrominance blue $C_b$, 109, pixels.

Figure 1B:
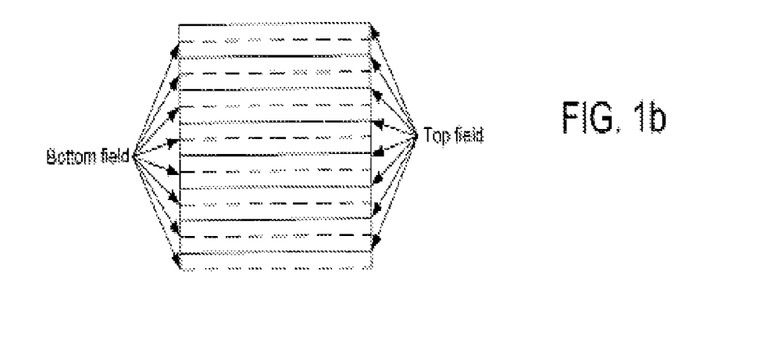
FIG. 1b illustrates an exemplary interlaced frame, in accordance with an embodiment of the present invention.

FIG. 1b is an illustration of a frame 103. A frame 103 can either be captured as an interlaced frame or as a progressive frame. In an interlaced frame 103, the even-numbered lines are captured during one time interval, while the odd-numbered lines are captured during an adjacent time interval. The even-numbered lines form the top field, while the odd-numbered lines form the bottom field of the interlaced frame.

Similarly, a display device can display a frame in progressive format or in interlaced format. A progressive display displays the lines of a frame sequentially, while an interlaced display displays one field followed by the other field. In a special case, a progressive frame can be displayed on an interlaced display by displaying the even-numbered lines of the progressive frame followed by the odd-numbered lines, or vice versa.

Referring again to FIG. 1a, the two-dimensional grids are divided into 8×8 blocks, where a group of four blocks or a 16×16 block 113 of luminance pixels Y is associated with a block 115 of chrominance red $C_r$, and a block 117 of chrominance blue $C_b$ pixels. The block 113 of luminance pixels Y, along with its corresponding block 115 of chrominance red pixels $C_r$, and block 117 of chrominance blue pixels $C_b$ form a data structure known as a macroblock 111. The macroblock 111 also includes additional parameters, including motion vectors, explained hereinafter. Each macroblock 111 represents image data in a 16×16 block area of the image.

The data in the macroblocks 111 is compressed in accordance with algorithms that take advantage of temporal and spatial redundancies. For example, in a motion picture, neighboring frames 103 usually have many similarities. Motion causes an increase in the differences between frames, the difference being between corresponding pixels of the frames, which necessitate utilizing large values for the transformation from one frame to another. The differences between the frames may be reduced using motion compensation, such that the transformation from frame to frame is minimized. The idea of motion compensation is based on the fact that when an object moves across a screen, the object may appear in different positions in different frames, but the object itself does not change substantially in appearance, in the sense that the pixels comprising the object have very close values, if not the same, regardless of their position within the frame. Measuring and recording the motion as a vector can reduce the picture differences. The vector can be used during decoding to shift a macroblock 111 of one frame to the appropriate part of another frame, thus creating movement of the object. Hence, instead of encoding the new value for each pixel, a block of pixels can be grouped, and the motion vector, which determines the position of that block of pixels in another frame, is encoded.

Accordingly, most of the macroblocks 111 are compared to portions of other frames 103 (reference frames). When an appropriate (most similar, i.e. containing the same object(s)) portion of a reference frame 103 is found, the differences between the portion of the reference frame 103 and the macroblock 111 are encoded. The location of the portion in the reference frame 103 is recorded as a motion vector. The encoded difference and the motion vector form part of the data structure encoding the macroblock 111. In the MPEG-2 standard, the macroblocks 111 from one frame 103 (a predicted frame) are limited to prediction from portions of no more than two reference frames 103. It is noted that frames 103 used as a reference frame for a predicted frame 103 can be a predicted frame 103 from another reference frame 103.

The macroblocks 111 representing a frame are grouped into different slice groups 119. The slice group 119 includes the macroblocks 111, as well as additional parameters describing the slice group. Each of the slice groups 119 forming the frame form the data portion of a picture structure 121. The picture 121 includes the slice groups 119 as well as additional parameters that further define the picture 121.

Figure 1C:
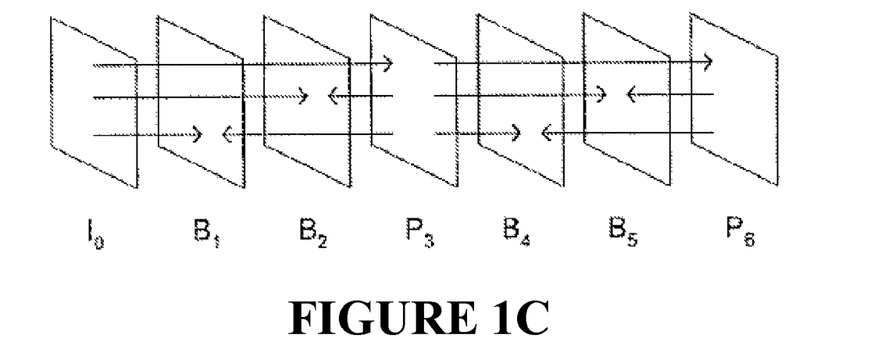
FIG. 1c illustrates an exemplary sequence of frames in display order, in accordance with an embodiment of the present invention.

$I_0$, $B_1$, $B_2$, $P_3$, $B_4$, $B_5$, $P_6$, $B_7$, $B_8$, $P_9$, in FIG. 1c, are exemplary pictures. The arrows illustrate the temporal prediction dependence of each picture. For example, picture $B_2$ is dependent on reference pictures $I_0$, and $P_3$. Pictures coded using temporal redundancy with respect to exclusively earlier pictures of the video sequence are known as predicted pictures (or P-pictures), for example picture $P_3$ is coded using reference picture $I_0$. Pictures coded using temporal redundancy with respect to earlier and/or later pictures of the video sequence are known as bi-directional pictures (or B-pictures), for example, pictures $B_1$ is coded using pictures $I_0$ and $P_3$. Pictures not coded using temporal redundancy are known as I-pictures, for example $I_0$. In the MPEG-2 standard, I-pictures and P-pictures are also referred to as reference pictures.

Figure 1D:
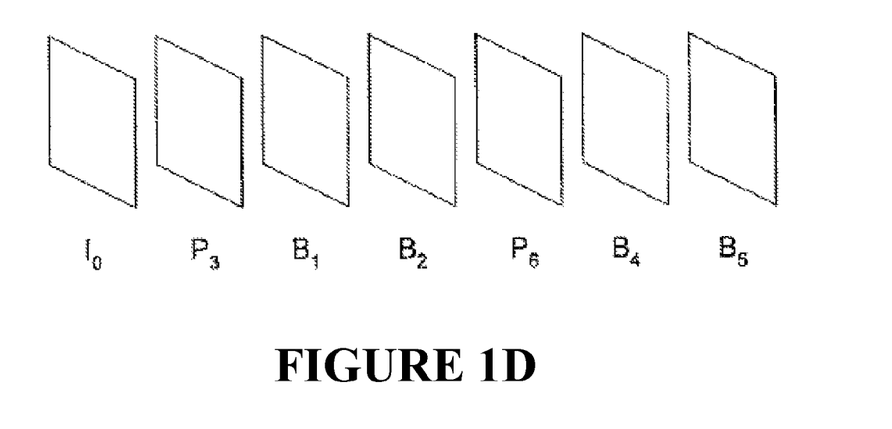
FIG. 1d illustrates an exemplary sequence of frames in decode order, in accordance with an embodiment of the present invention.

The foregoing data dependency among the pictures requires decoding of certain pictures prior to others. Additionally, the use of later pictures as reference pictures for previous pictures requires that the later picture is decoded prior to the previous picture. As a result, the pictures cannot be decoded in temporal display order, i.e. the pictures may be decoded in a different order than the order in which they will be displayed on the screen. Accordingly, the pictures are transmitted in data dependent order, and the decoder reorders the pictures for presentation after decoding. $I_0$, $P_3$, $B_1$, $B_2$, $P_6$, $B_4$, $B_5$, $P_9$, $B_6$, $B_7$, in FIG. 1d, represent the pictures in data dependent and decoding order, different from the display order seen in FIG. 1c.

Referring again to FIG. 1a, the pictures are then grouped together as a group of pictures (GOP) 123. The GOP 123 also includes additional parameters further describing the GOP. Groups of pictures 123 are then stored, forming what is known as a video elementary stream (VES) 125. The VES 125 is then packetized to form a packetized elementary sequence. The packetized elementary stream includes parameters, such as the decode time stamp and the presentation time stamp. Each packet is then associated with a transport header, forming what are known as transport packets.

The transport packets can be multiplexed with other transport packets carrying other content, such as another video elementary stream 125 or an audio elementary stream. The multiplexed transport packets form what is known as a transport stream. The transport stream is transmitted over a communication medium for decoding and displaying.

Figure 2:
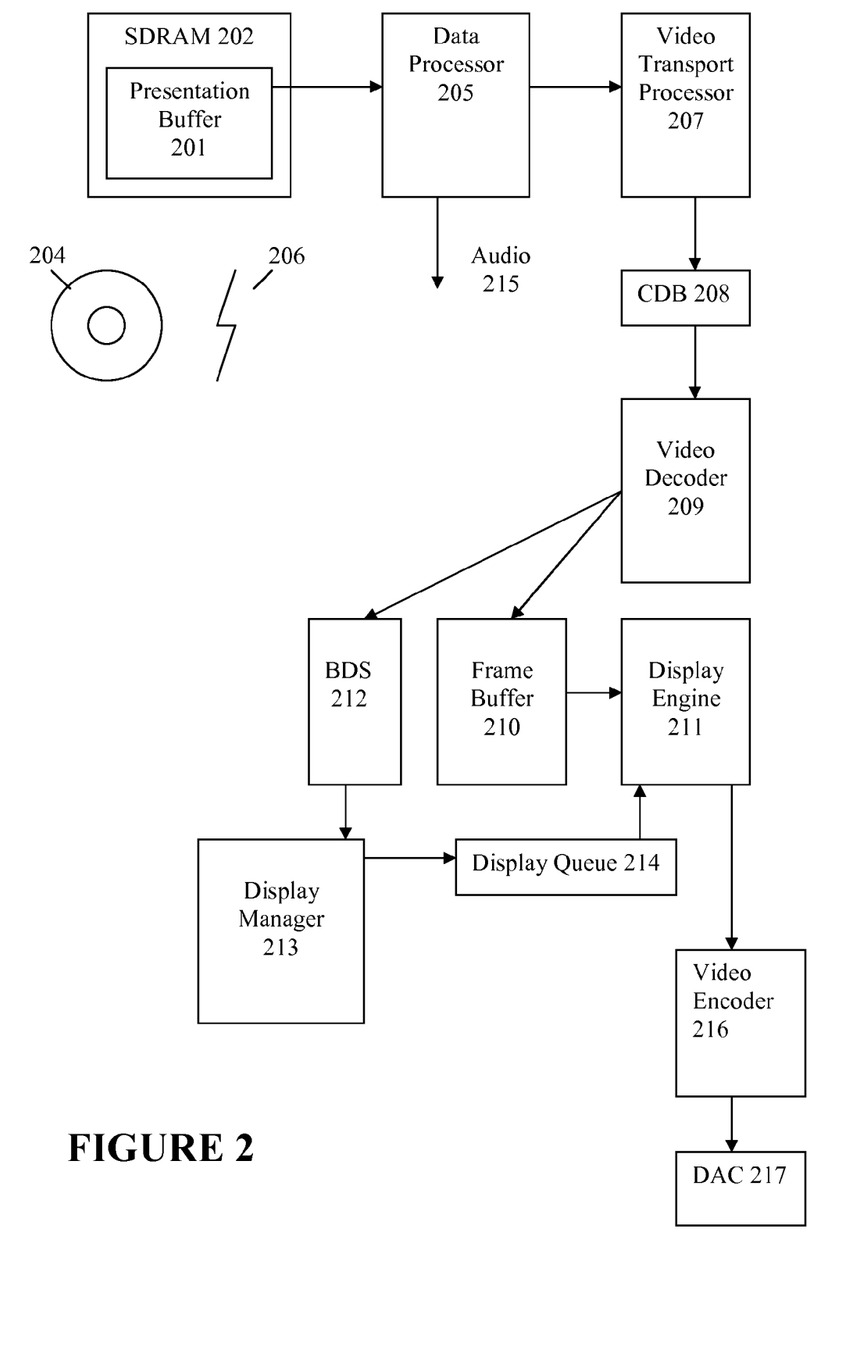
FIG. 2 is a block diagram of a decoder system in accordance with an embodiment of the present invention.

Referring now to FIG. 2, there is illustrated a block diagram of an exemplary circuit for decoding the compressed video data, in accordance with an embodiment of the present invention. A presentation buffer 201 within a Synchronous Dynamic Random Access Memory (SDRAM) 202 receives a transport stream. The presentation buffer 201 can receive the transport stream, either from a storage device 204, such as, for example, a hard disc or a DVD, or a communication channel 206.

A data transport processor 205 demultiplexes the transport stream into audio transport streams and video transport streams. The data transport processor 205 provides the audio transport stream to an audio portion 215 and the video transport stream to a video transport processor 207. The video transport processor 207 parses the video transport stream and recovers the video elementary stream. The video transport processor 207 writes the video elementary stream to a compressed data buffer 208. A video decoder 209 reads the video elementary stream from the compressed data buffer 208 and decodes the video. The video decoder 209 decodes the video on a picture by picture basis. When the video decoder 209 decodes a picture, the video decoder 209 writes the picture to a frame buffer 210.

The video decoder 209 receives the pictures in decoding order. However, as noted above, the decoding and displaying orders can be different. Accordingly, the decoded pictures are stored in frame buffers 210 to be available at display time. At display time, display engine 211 scales the video picture, renders the graphics, and constructs the complete display. Once the display is ready to be presented, it is passed to a video encoder 216 where it is converted to analog video using an internal digital to analog converter (DAC). The digital audio is converted to analog in an audio digital to analog converter (DAC) 217.

The frame buffers 210 also allow the video decoder 209 to predict predicted pictures from reference pictures. The decoder 209 decodes at least one picture, $I_0$, $B_1$, $B_2$, $P_3$, $B_4$, $B_5$, $P_6$, $B_7$, $B_8$, $P_9$, during each frame display period, in the absence of Personal Video Recording (PVR) modes when live decoding is turned on. Due to the presence of the B-pictures, $B_1$, $B_2$, the decoder 209 decodes the pictures, $I^0$, $B_1$, $B_2$, $P_3$, $B_4$, $B_5$, $P_6$, $B_7$, $B_8$, $P_9$ in an order that is different from the display order. The decoder 209 decodes each of the reference pictures, e.g., $I_0$, $P_3$, prior to each picture that is predicted from the reference picture. For example, the decoder 209 decodes $I_0$, $B_1$, $B_2$, $P_3$, in the order, $I_0$, $P_3$, $B_1$, and $B_2$. After decoding $I_0$ and $P_3$, the decoder 209 applies the offsets and displacements stored in $B_1$ and $B_2$, to the decoded $I_0$ and $P_3$, to decode $B_1$ and $B_2$. The frame buffers 210 store the decoded pictures, $I_0$ and $P_3$, in order for the video decoder 209 to decode $B_1$ and $B_2$.

The video decoder 209 also writes a number of parameters associated with each picture in a buffer descriptor structure 212. Each frame buffer 210 is associated with a buffer descriptor structure 212. The buffer descriptor structure 212 associated with a frame buffer 210 stores parameters associated with the picture stored in the frame buffer 210. The parameters can include, for example presentation time stamps.

A display manager 213 examines the buffer descriptor structures, and on the basis of the information therein, determines the display order for the pictures. The display manager 213 maintains a display queue 214. The display queue 214 includes identifiers identifying the frame buffers 210 storing the pictures to be displayed. The display engine 211 examines the display queue 214 to determine the next picture to be displayed.

The display manager 213 can determine the next picture to be displayed by examining the PTS parameters associated with the pictures. The display manager 213 can compare the PTS values associated with pictures to a system clock reference (SCR) to determine the ordering of the pictures for display.

Alternatively, the display manager 213 can also determine the order of the pictures to be displayed by examining the type of pictures decoded. In general, when the video decoder 209 decodes a B-picture, the B-picture is the next picture to be displayed. When the video decoder 209 decodes an I-picture or P-picture, the display manager 213 selects the I-picture or P-picture that was most recently stored in the frame buffer 210 to be displayed next.

A particular one of the frame buffers 210 stores B-pictures, while two other frame buffers 210 store I-pictures and P-pictures. When the video decoder 209 decodes a B-picture, the video decoder 209 writes the B-picture to the particular frame buffer 210 for storing B-pictures, thereby overwriting the previously stored B-picture. When the video decoder 209 decodes an I-picture or a P-picture, the video decoder 209 writes the I-picture or P-picture to the frame buffer 210 storing the I-picture or P-picture that has been stored for the longest period of time, thereby overwriting the I-picture or P-picture.

The circuit also supports a number of functions allowing the user to control the presentation of the video. These functions include slow motion and high speed. Slow motion allows a user to display a particular video at a slower rate. The slower rate can be controllable by the user. High speed allows a user to display a particular video at a faster rate that can also be controlled by the user.

Figure 3:
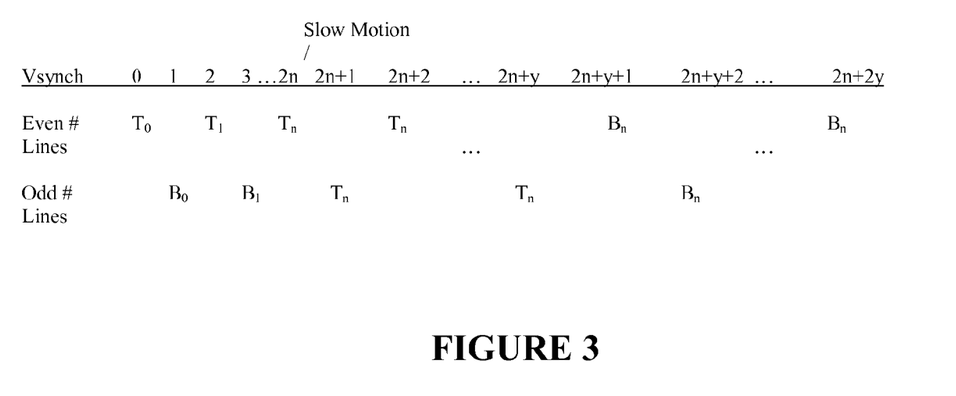
FIG. 3 is a block diagram describing slow motion in accordance with an embodiment of the present invention.

Referring now to FIG. 3, there is illustrated a timing diagram describing the display of pictures in slow motion on an interlaced display where frame rate conversion is not required. During vsynch 0 . . . 2n, the display engine 211 provides fields $T_0$, $B_0$, . . . , $T_n$, $B_n$. (the letter T indicates the top field, B indicates the bottom field, the subscript indicates the normal speed video display order). During the even numbered vsynchs, e.g., 0, 2, . . . 2n, the even-numbered lines of the display device display video data. During the odd-numbered vsynchs, e.g., 1, 3, . . . , 2n−1, odd-numbered lines of the display device display video data.

Between Vsynchs 2n and 2n+1, the user selects the slow motion feature. The user selects the slow motion feature, requesting to display the pictures at slower speed by a factor of y (one minute of the video takes y minutes to display). During slow motion, the display engine 211 and the display manager 213 turn off the time stamp management, because the video is displayed at a slower speed compared to the system time clock. Accordingly, the PTS of pictures will not match the system time clock running at the normal rate.

The display engine 211 implements the slow motion by repeating each picture element by the slow motion rate before moving on to the next displayable picture. The pictures include a top field, and a bottom field, e.g., $T_n$, $B_n$. The display engine 211 displays the top field y times followed by the bottom field, y times.

Therefore, during vsynchs 2n+1, . . . 2n+y, the display engine 211 displays top field, $T_n$. It is noted that during vsynchs 2n+1, 2n+3, . . . , the display device displays the video on odd-numbered lines. The top field $T_n$ comprises the even-numbered lines of a picture. During vsynchs 2n+1, 2n+3, . . . , the display engine 211 provides the lines of top field $T_n$, for display on the odd-numbered lines of the display. For example, each line of the top field $T_n$, 0, 2, 4 . . . , 2x can be displayed on lines 1, 3, 5, 2x+1.

During vsynch 2n+y+1, 2n+2y, the display engine 211 displays bottom field $B_n$. During alternating vsynchs of 2n+y+1 . . . 2n+2y, the display device displays the video on even-numbered fields. The bottom field $B_n$ comprises the odd-numbered lines of a picture. During those vsynchs, the display engine 211 provides the lines of bottom field $B_n$, for display on the even-numbered lines of the display. For example, each line of the top field $B_n$, 1, 3, 5 . . . , 2x+1 can be displayed on lines 0, 2, 4, 2x.

The foregoing results in a smoother slow motion display. Additionally, because the display engine 211 takes care to repeat each field of a picture, picture or picture elements that are displayed more than once are repeated in the display order. Furthermore, the display engine 211 does the field repeats on top of any frame rate conversion that may be active already. Thus, if PAL to NTSC conversion or 3:2 pull down are being done, then some repeats will be utilized even for normal rate of video. So if slow motion is also enabled, then the display engine will do the repeats in addition to the repeats already done for frame rate conversions. For example, during 3:2 pull down, the display queue 214 may include the display sequence, $T_n$, $B_n$, $T_{n+1}$, $B_{n+1}$, $T_{n+1}$. The display engine 211 with slow motion by a factor of 3 would display the sequence, $T_n$, $B_n$, $T_{n+1}$, $B_{n+1}$, $T_{n+1}$, as $T_n$, $T_n$, $T_n$, $B_n$, $B_n$, $B_n$, $T_{n+1}$, $T_{n+1}$, $T_{n+1}$, $B_{n+1}$, $B_{n+1}$, $B_{n+1}$, $T_{n+1}$, $T_{n+1}$, $T_{n+1}$.

Once the normal video is resumed, the system time clock would have raced ahead of the PTS of the displayed pictures. Accordingly, the display engine 211 loads the PTS value of the first picture after normal rate video is resumed into the STC and resumes the time stamp management.

Figure 4:
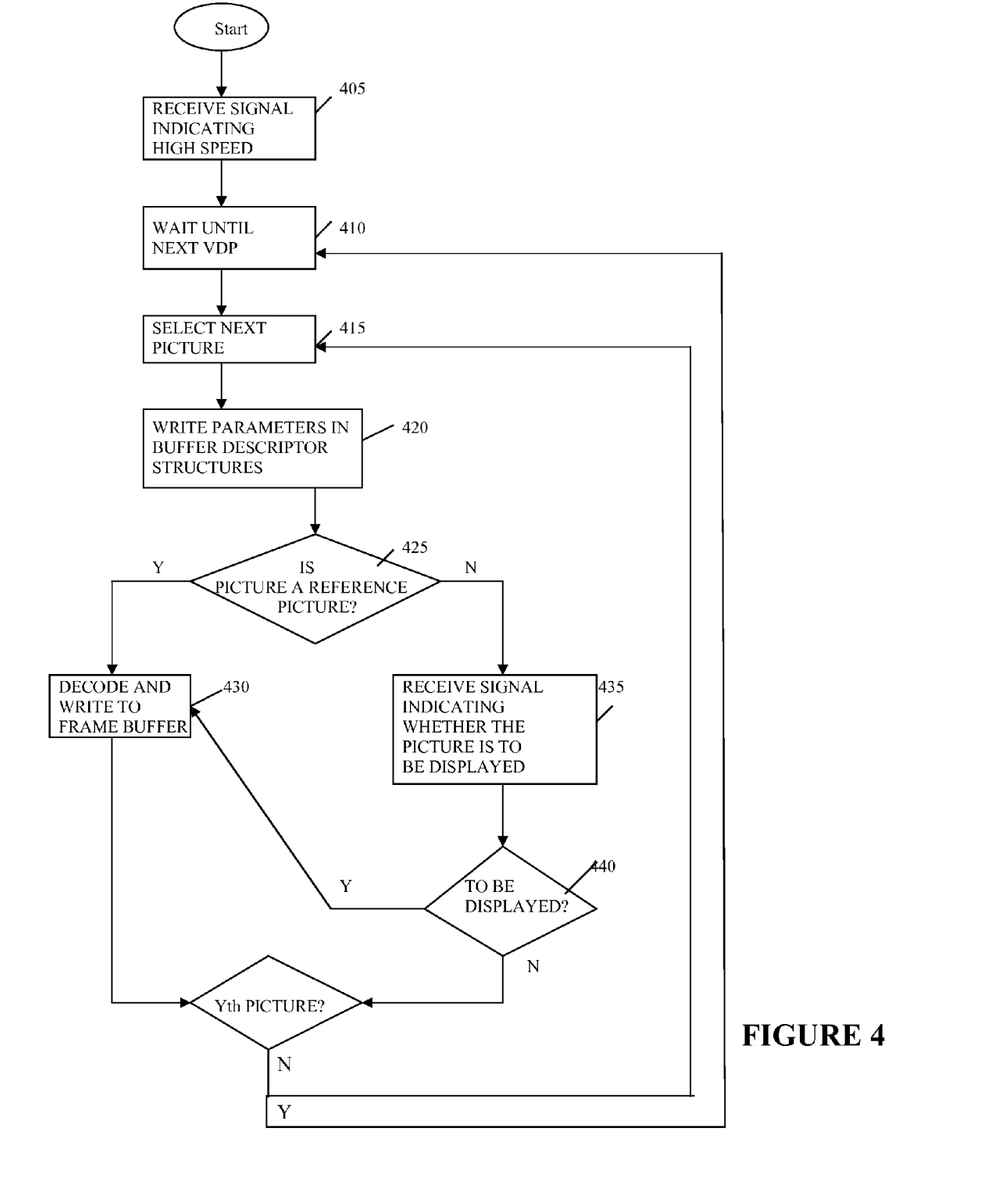
FIG. 4 is a flow diagram describing the operation of the video decoder in accordance with an embodiment of the present invention.
Figure 5:
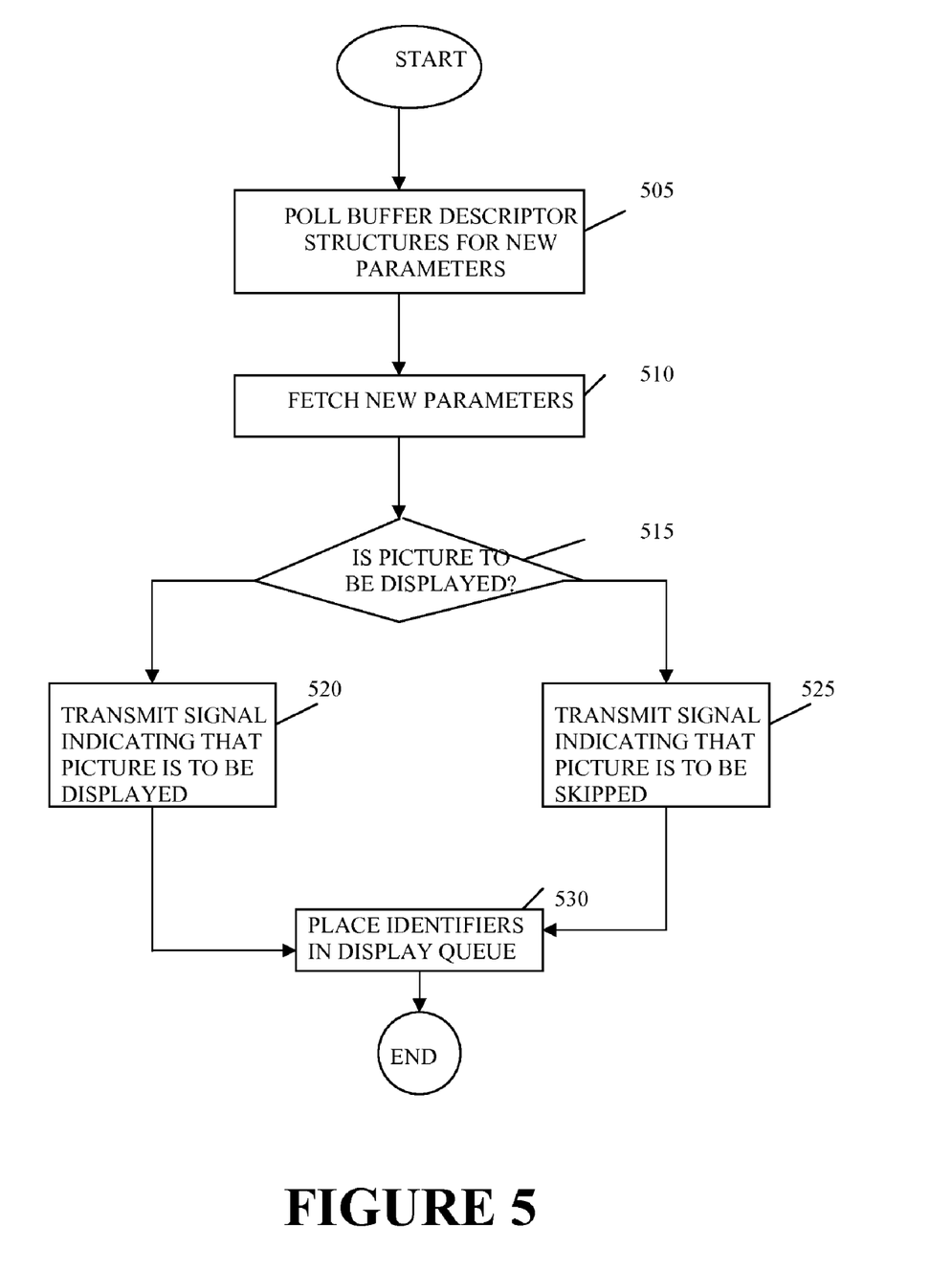
FIG. 5 is a flow diagram describing the operation of the display manager in accordance with an embodiment of the present invention.

Referring now to FIGS. 4 and 5, there are illustrated flow diagrams describing the operation of the video decoder 209 and the display manager 213, respectively, during the display of video in high speed, in accordance with an embodiment of the invention. In one embodiment, the term Video Display Period (VDP) shall refer to the period of time for displaying a single picture. For example, for a progressive display, the VDP is one period between vertical synchronization pulses. For an interlaced display, the VDP is two periods between vertical synchronization pulses.

At 405, the video decoder 209 receives a signal indicating that the video is to be displayed at high speed by a factor of Y, i.e., Y minutes of video are to be displayed in one minute. At the next VDP (after 410), the video decoder 209 examines the next y pictures in decode order. For each of the Y pictures (415), the video decoder 209 writes (420) the parameters regarding the picture in a buffer descriptor structure 212. At 425, the video decoder 209 determines whether the picture is a reference picture (an I or P picture). If the picture is a reference picture, the video decoder 209 decodes and writes (430) the picture to a frame buffer.

If the picture is not a reference picture (a B-picture), the video decoder 209 receives (435) an indication from the display manager 213 indicating whether the picture is to be displayed.

Turning now to FIG. 5, there is illustrated a block diagram describing the operation of the display manager 213 in accordance with an embodiment of the present invention. The display manager 213 polls (505) the buffer descriptor structures 212 for parameters written by the video decoder 209. When the video decoder 209 writes the information to the buffer descriptor structures 212, the video decoder 209 fetches (510) the information from the buffer descriptor structures 212.

The display manager 213 examines the information to determine (515) whether the picture associated with the information will be displayed or skipped in the fast forward order. If during 515, the display manager 213 determines that the picture will be skipped, the display manager 213 transmits (520) a signal to the video decoder 209 indicating that the picture is skipped.

If the display manager 213 determines that the picture associated with the information will be displayed in the fast forward order, the display manager 213 transmits (525) a signal to the video decoder 209 indicating that the picture is displayed.

Based on the information fetched during 510, the display manager 213, may also be able to update the display order of the pictures. At 530, the display manager 213 places identifiers identifying pictures for display in the display queue 212.

Referring again to FIG. 4, the indication received during 435 is the signal transmitted by the display manager during either 520 or 525. If the signal indicates that the B-picture is to be displayed (at 440), the video decoder 209 decodes the B-picture and writes (430) the B-picture to the frame buffer. If at 440, the signal indicates that the B-picture is not to be displayed, the video decoder 209 can skip decoding the B-picture. The foregoing is repeated for all Y pictures. After the foregoing is done for all Y pictures, the video decoder 209 waits until the next VDP and repeats the process for the next Y pictures.

Figure 6:
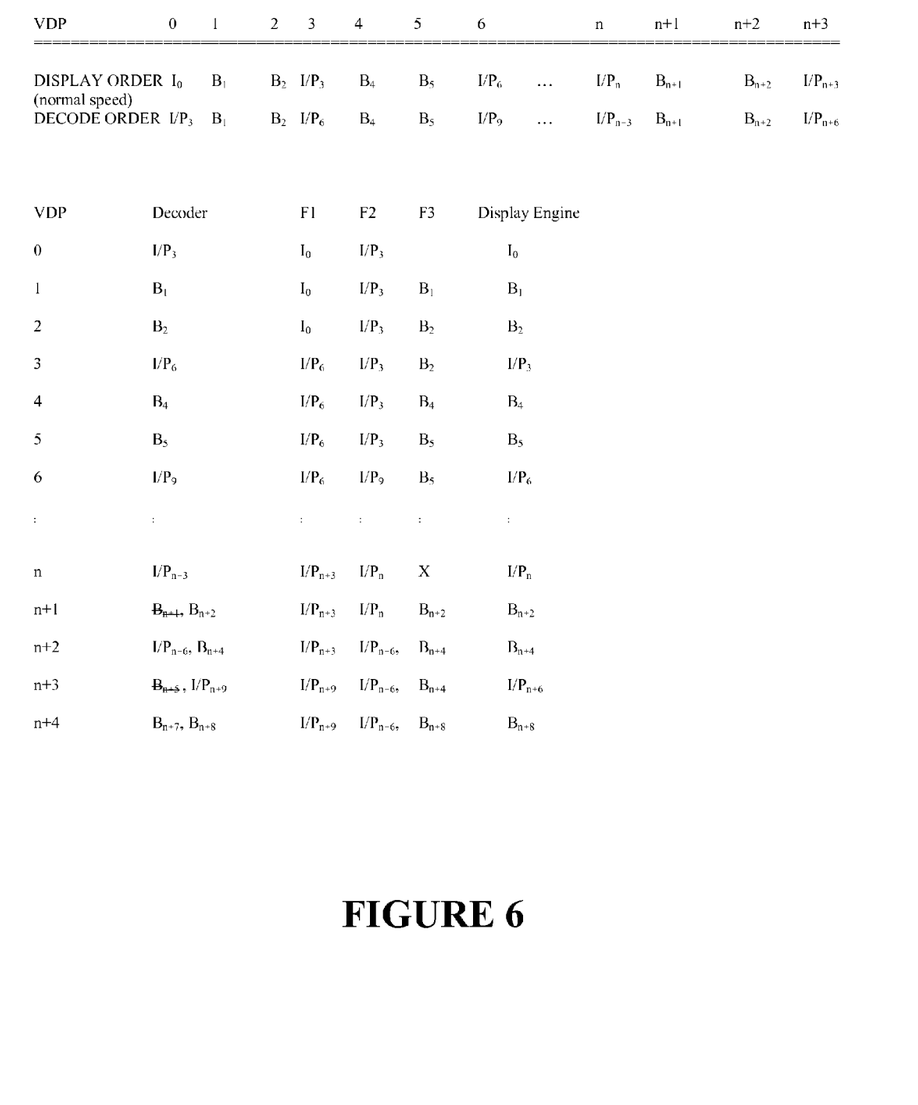
FIG. 6 is a timing diagram describing the display of exemplary pictures in accordance with an embodiment of the present invention.

Referring now to FIG. 6 there is illustrated a timing diagram describing the display of exemplary pictures in high speed in accordance with an embodiment of the present invention. The pictures in display order are $I_0$, $B_1$, $B_2$, $I/P_3$, $B_4$, $B_5$, $I/P_6$, . . . , $I/P_n$, $B_{n+1}$, $B_{n+2}$, $I/P_{n+3}$ . . . . The pictures in decoder order are $I_0$, $I/P_3$, $B_1$, $B_2$, $I/P_6$, $B_4$, $B_5$, $I/P_9$, . . . , $I/P_{n+3}$, $N_{n+1}$, $B_{n+2}$, $I/P_{n+6}$ . . . . The subscript indicates the display order, while "I/P" indicates that the picture is either an I or P-picture. In the discussion, the vertical synchronization pulses shall correspond to a progressive display, although the invention is also applicable where an interlaced display is used.

Prior to VDP 0, picture $I_0$ is previously decoded and stored in frame buffer F1. At VDP 0, the video decoder 209 decodes $I/P_3$ and writes $I/P_3$ to frame buffer F2 and display engine 211 displays $I_0$. The pictures decoded by video decoder 209, stored in frame buffers F1, F2, and F3, and displayed by display engine are as shown. It is noted that there is a lag between the video decoder 209 and the display engine 211, and accordingly, the video decoder 209 decodes the indicated picture at a time corresponding to the indicated VDP minus the lag.

Between VDP n and n+1, the user selects the high speed function to display pictures faster by a factor of 2. The display engine 211 displays one of every two pictures. Thus, at VDP n+i (where i is a positive integer), the display engine 211 displays, either $I/P/B_{n+2i}$. Additionally, the display engine 211 and the display manager 214 turn off the time stamp management because the PTSs of the pictures will race ahead of the STC.

During the high speed, the video decoder 209 examines the factor number of pictures, e.g., 2, per VDP. From the examined pictures, the video decoder 209 decodes and writes to the frame buffers, all of the I and P pictures. Additionally, from the examined pictures, the video decoder 209 decodes and writes to the frame buffer, B-pictures that are to be displayed by the display engine 211. When the video decoder 209 examines the pictures, the video decoder 209 writes certain information to the buffer descriptor structures 212. Based on the information written to the buffer descriptor structures 212, the display manager 213 determines the high-speed order of the pictures to be displayed and pushes the pictures to the display queue 214. The display manager 213 also determines whether a picture is skipped or displayed. When the display manager 213 determines that a B-picture is to be skipped, the display manager 213 signals the video decoder 209. The video decoder 209 skips decoding B-pictures that are not to be displayed by the display engine 211.

During VDP n+1, the display engine 211 displays $B_{n+2}$. During VDP n+1, the video decoder 209 examines $B_{n+1}$, and $B_{n+2}$. However, the display engine 211 displays $B_{n+2}$, during VDP n+1, and skips $B_{n+1}$. Therefore, the video decoder 209 decodes $B_{n+2}$, and writes $B_{n+2}$ to frame buffer F3. The video decoder 209 can skip decoding $B_{n+1}$.

During VDP n+2, the display engine 211 displays $B_{n+4}$. During VDP n+2, the video decoder 209 examines $I/P_{n+6}$, and $B_{n+4}$. The display engine displays $B_{n+4}$ and $I/P_{n+6}$, during VDPs n+2 and n+3, respectively. The video decoder 209 decodes $I/P_{n+6}$, and $B_{n+4}$ and writes them to frame buffers F2 and F3, respectively.

During VDP n+3, the display engine 211 displays $I/P_{n+6}$. The video decoder 209 examines $B_{n+5}$, and $I/P_{n+9}$. The display engine 211 skips displaying $B_{n+5}$. Accordingly, the video decoder 209 can skip decoding $B_{n+5}$. Although the display engine 211 will skip displaying $I/P_{n+9}$, (at VDPs 4 and 5, the display engine 211 displays $B_{n+8}$ and $B_{n+10}$, respectively), the video decoder 209 decodes $I/P_{n+9}$ because it is a reference picture for other pictures. The video decoder 209 uses $I/P_{n+9}$ to decode $B_8$, $B_{10}$, and $I/P_{12}$ that are displayed by the display engine 211.

During VDP n+4, the display engine 211 displays $B_{n+8}$. The video decoder 209 examines $B_{n+7}$, and $B_{n+8}$. The display engine 211 skips displaying $B_{n+7}$. Accordingly, the video decoder 209 can skip decoding $B_{n+7}$. Since $B_{n+8}$ is to be displayed, the video decoder 209 decodes $B_{n+8}$ and writes $B_{n+8}$ to frame buffer F3.

The foregoing can also be applied in the case where the display device is interlaced. Where the display device is interlaced, the display device transmits VDPs for both the top field and the bottom field for each picture. During the VDP for the top field and the bottom fields, the respective field is displayed. During the pause, the top field and the bottom field of the pause picture, $B_4$ can be displayed continuously in alternating order.

The circuit as described herein may be implemented as a board level product, as a single chip, application specific integrated circuit (ASIC), or with varying levels of the system integrated on a single chip with other portions of the system as separate components. The degree of integration of the monitoring system may primarily be determined by speed of incoming MPEG packets, and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device wherein the memory storing instructions is implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment (s) disclosed, but that the invention will include all embodiments falling within the scope of the appended claims.

The invention claimed is:

1. A system for displaying pictures at high speed by a factor of a predetermined number, said system comprising:
    a buffer for storing parameters associated with the predetermined number of the pictures during a video display period;
    a video decoder for decoding particular ones of the predetermined number of the pictures, wherein the predetermined ones are either reference pictures or pictures that are to be displayed at high speed; and
    wherein the pictures that are displayed in high speed at each display interval have a constant time-lapse between the pictures that are displayed in high speed at the next display interval.

2. The system of claim 1, further comprising:
    a display manager for determining which ones of the predetermined number of the pictures are displayed at high speed.

3. The system of claim 2, wherein some of the reference pictures are not among the ones of the predetermined number of the pictures that are displayed at high speed.

4. The system of claim 3, wherein some of the ones of the predetermined number of pictures displayed at high speed are not reference pictures.

5. The system of claim 4, wherein the some of the ones of the predetermined number of pictures displayed at high speed are bi-directionally predicted pictures.

6. A method for displaying pictures, said method comprising:
    receiving an indication to display the pictures at high speed by a factor of a predetermined number;
    examining the predetermined number of the pictures during a video display period;
    decoding particular ones of the predetermined number of the pictures, wherein the predetermined ones are either reference pictures or pictures that are to be displayed at high speed;
    determining which ones of the predetermined number of the pictures are displayed at high speed;
    wherein some of the reference pictures are not among the ones of the predetermined number of the pictures that are displayed at high speed;
    wherein some of the ones of the predetermined number of pictures displayed at high speed are not reference pictures; and
    wherein the some of the ones of the predetermined number of pictures displayed at high speed are bi-directionally predicted pictures.

7. A system for displaying pictures at high speed by a factor of a predetermined number, said system comprising:
    a buffer for storing parameters associated with the predetermined number of the pictures during a video display period;

a video decoder for decoding particular ones of the predetermined number of the pictures, wherein the predetermined ones are either reference pictures or pictures that are to be displayed at high speed;

a display manager for determining which ones of the predetermined number of the pictures are displayed at high speed;

wherein some of the reference pictures are not among the ones of the predetermined number of the pictures that are displayed at high speed;

wherein some of the ones of the predetermined number of pictures displayed at high speed are not reference pictures; and wherein the some of the ones of the predetermined number of pictures displayed at high speed are bi-directionally predicted pictures.

8. The method of claim 6, wherein some of the pictures that are displayed at high-speed are predicted from reference pictures.

* * * * *